Patented Nov. 3, 1942

2,300,920

UNITED STATES PATENT OFFICE 2,300,920

INTERPOLYMERS OF VINYL SULPHONIC ACID WITH ANOTHER VINYL COMPOUND AND AQUEOUS EMULSIONS THEREOF

Werner Heuer, deceased, late of Hofheim in Taunus, Germany, by Johanna Auguste Asta Heuer, administratrix, Hofheim in Taunus, Germany, assignor, by mesne assignments, to General Aniline & Film Corporation, New York, N. Y., a corporation of Delaware No Drawing. Application May 27, 1939, Serial No. 276,224. In Germany June 7, 1938

10 Claims. (Cl. 260—32)

The present invention relates to polymerization products and aqueous emulsions thereof.

A process has been found in which vinylsulfonic acid or a salt thereof is polymerized in mixture with a polymerizable unsaturated organic compound whereby new interpolymerization products are obtained.

The vinylsulfonic acid and, its watersoluble salts are especially suitable for introduction in limited quantities into the final product during the polymerization of a polymerizable compound. If, for instance, mixtures are polymerized which contain at least about 5 to 10 per cent. by weight of vinyl sulfonic acid or one of its salts, the interpolymerizates obtained are insoluble in water. The quantity of the entering sulfonic acid depends on the conditions applied, especially, however, on the nature of the chief component, but the quantity of the detectable sulfonic groups in the polymeric molecule preferably remains within the order of magnitude represented above. A very small quantity of vinylsulfonic acid may be used, for instance, 0.1 per cent. calculated upon the weight of the other polymerizable compound.

If the process starts with a small quantity of the vinylsulfonic acid or the salt thereof the water-insoluble polymerizate may advantageously be made in the form of an emulsion by polymerizing in the presence of water or an aqueous medium. The emulsion thus obtained has an especially good stability. The industrial advantage of this process therefore resides in the fact that it is not necessary for the production of emulsion-polymerizates to use, as hitherto necessary, special emulsifying agents or dispersing agents, for instance those made on a basis of fats or water-soluble bodies having a high molecular weight, for these emulsifying agents have many drawbacks. The main drawback is that for each vinyl compound a suitable emulsifying agent must be chosen for obtaining the optimum emulsion properties. A certain emulsifying agent, applied for a certain vinyl compound, yields an emulsion polymerizate of an exactly defined size of particle, stability, film-forming-power and the like while with another vinyl compound it yields an emulsion-polymerizate with another size of particle and so on. On the other hand a vinyl compound forms with one emulsifying agent a polymerizate having properties differing from those of the polymerizate which it forms with another emulsifying agent. A vinylsulfonic acid, however, can be introduced into a polymeric molecule with the effect that emulsions or dispersions of polymeric bodies are obtained which do not consist of a mixture of the emulsifying agent and the polymerizate but of individual bodies.

An advantage of the invention is the improved stability of the emulsions produced.

The polymerization may be performed in the manner usual for polymerizing, for instance, vinyl componds, e. g. by heating in the presence of a catalyst such as hydrogen superoxide, potassium persulfate, benzoyl peroxide, oleyl peroxide and the like.

As watersoluble salts of the vinylsulfonic acid of the formula $H_2C=CH \cdot SO_3H$ there may for instance be mentioned: the sodium salt, the potassium salt, the ammonium salt and the salts of said acid with amines, such as methylamine, dimethylamine, ethylamine, diethylamine, triethanolamine.

Other polymerizable compounds to be used in the process of this invention are those containing the group $>C=CH_2$ especially vinyl compounds such as vinylacetate, vinylformate, vinylpropionate, vinylbutyrate, vinylchloride, acrylic acid methylester, acrylic acid ethylester, acrylic acid propylester, methacrylic acid methylester, methacrylic acid ethylester, methacrylic acid propylester, styrol, vinylketones such as vinylmethylketone, vinylethers such as vinylbutylether.

The following examples in which the parts are by weight serve to illustrate the invention, but they are not intended to limit it thereto:

(1) 5 parts of potassium persulfate and 2.5 parts of sodium vinylsulfonate are dissolved together in 500 parts of water. The solution is heated, while stirring, in a vessel provided with a reflux apparatus, so that the heating bath has a temperature of 80° C. to 85° C. 500 parts of vinyl acetate are then introduced at the same rate as that at which the polymerization proceeds. It is advisable to take care that during the polymerization as small a quantity as possible of vinylacetate-condensate is formed in the condenser. In about 2 hours the addition is terminated, the reaction mixture is further heated for half an hour and then cooled, while stirring. A very thin liquid emulsion which is of 50 per cent. strength and very stable, is obtained.

(2) 500 parts of ethylacrylate are polymerized in the same manner as described in Example 1, in a solution of 500 parts of water, 5 parts of potassium persulfate and 2.5 parts of sodium vinylsulfonate. Generally the polymerization occurs somewhat more rapidly than that of the vinyl acetate. There is obtained a stable thinly liquid emulsion of 50 per cent. strength.

(3) A solution of 500 parts of water, 5 parts of potassium persulphate and 5 parts of sodium vinylsulphonate is heated in an autoclave provided with a stirring device to 50° C. to 55° C. and a mixture of 70 parts of vinyl acetate and 30 parts of vinyl chloride is slowly added in the course of 2 to 4 hours, at such a rate that the temperature in the interior of the autoclave does not exceed 55° C. When the entire quantity of the monomer has been added the mixture is further heated for 1 hour and cooled while stirring. A thinly liquid emulsion of 50 per cent. strength is obtained.

It is of course also possible to polymerize in the same manner two or more polymerizable components by means of vinylsulphonic acid or a salt thereof.

(4) A solution of 0.5 part of sodium vinylsulphonate, 0.1 part of dioleylperoxide and 0.02 part of dibenzoylperoxide in 2.5 parts of water is finely distributed by rapidly stirring in 100 parts of vinylacetate. 10 parts of this mixture are introduced into a vessel provided with a reflux apparatus and heated to 80° C. to 85° C. After polymerization has set in the mixture of the monomers is added pari passu with the progress of the polymerization. A solid block is obtained consisting of an interpolymerizate of vinyl acetate and vinylsulpohnic acid.

It is claimed:

1. Interpolymerization products of at least one polymerizable compound containing a single >C=CH$_2$ group with a compound of the group consisting of vinylsulphonic acid and its water-soluble salts in an amount of at most 10 per cent. calculated upon the weight of the other polymerizable compound or compounds.

2. Interpolymerization products of at least one polymerizable vinylcompound containing a single vinyl group with a compound of the group consisting of vinylsulphonic acid and its water-soluble salts in an amount of at most 10 per cent. calculated upon the weight of the other polymerizable vinylcompound or compounds.

3. The interpolymerization product of vinylacetate with 0.5 per cent. of the sodium salt of vinylsulphonic acid calculated upon the weight of vinylacetate.

4. The interpolymerization product of acrylic acid ethyl ester with 0.5 per cent. of the sodium salt of vinylsulphonic acid calculated upon the weight of acrylic acid ethyl ester.

5. The interpolymerization products of vinylacetate with vinylchloride and 5 per cent. of the sodium salt of vinylsulphonic acid calculated upon the combined weight of vinylacetate and vinylchloride.

6. Aqueous emulsions of the interploymerization products in occordance with claim 1, said emulsions being stable without addition of known emulsifying agents.

7. Aqueous emulsions of the interpolymerization products in accordance with claim 2, said emulsions being stable without addition of known emulsifying agents.

8. Aqueous emulsions of the interpolymerization product in accordance with claim 3, said emulsions being stable without addition of known emulsifying agents.

9. Aqueous emulsions of the interpolymerization product in accordance with claim 4, said emulsions being stable without addition of known emulsifying agents.

10. Aqueous emulsions of the interpolymerization products in accordance with claim 5, said emulsions being stable without addition of known emulsifying agents.

JOHANNA AUGUSTE ASTA HEUER,
*As Administratrix of Werner Heuer, Deceased.*